United States Patent
Fuchs et al.

(10) Patent No.: US 11,543,240 B2
(45) Date of Patent: Jan. 3, 2023

(54) SIX DOF MEASUREMENT AID MODULE FOR DETERMINING 3D COORDINATES OF POINTS TO BE MEASURED OF AN OBJECT SURFACE

(71) Applicant: LEICA GEOSYSTEMS AG, Heerbrugg (CH)

(72) Inventors: Simon Fuchs, Schöftland (CH); Daniel Moser, Seengen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 144 days.

(21) Appl. No.: 17/215,638

(22) Filed: Mar. 29, 2021

(65) Prior Publication Data
US 2021/0310794 A1 Oct. 7, 2021

(30) Foreign Application Priority Data
Apr. 1, 2020 (EP) .................................... 20167627

(51) Int. Cl.
| | |
|---|---|
| *G01B 11/00* | (2006.01) |
| *G01B 5/00* | (2006.01) |
| *G01B 5/20* | (2006.01) |
| *G01B 11/25* | (2006.01) |
| *G01B 5/004* | (2006.01) |

(52) U.S. Cl.
CPC ........ *G01B 11/2504* (2013.01); *G01B 5/0002* (2013.01); *G01B 5/004* (2013.01); *G01B 5/20* (2013.01); *G01B 11/002* (2013.01); *G01B 11/2513* (2013.01)

(58) Field of Classification Search
CPC .. G01B 11/2504; G01B 5/0002; G01B 5/004; G01B 5/20; G01B 11/002; G01B 11/2513; G01B 21/047; G01B 21/00
See application file for complete search history.

(56) References Cited

U.S. PATENT DOCUMENTS 5,836,082 A * 11/1998 Sheldon ................. G01B 5/012
33/558.2
5,870,834 A * 2/1999 Sheldon ................. G01B 5/004
33/502

(Continued)

OTHER PUBLICATIONS

European Search Report dated Sep. 11, 2020 as received in U.S. Appl. No. 20/167,627.

*Primary Examiner* — Yaritza Guadalupe-McCall
(74) *Attorney, Agent, or Firm* — Maschoff Brennan

(57) ABSTRACT

A six DOF measurement aid module for determining 3D coordinates of points to be measured of an object surface, comprising a laser tracker for determining the position and orientation of the six DOF measurement aid module. The six DOF measurement aid module has a body comprising an object coupling device with an object interface, configured to couple, via the object interface, alternatively both a handle to the body with a fixed pose and the body to a mobile platform with a fixed pose, a sensor attachment coupling device with a sensor interface-configured to couple alternatively both a sensor attachment effecting non-contact measurement and a sensor attachment effecting tactile measurement to the body with a fixed pose via the sensor interface, and visual markings, which are arranged in a defined spatial relationship in a manner forming a pattern in a marking region on the body.

16 Claims, 3 Drawing Sheets

(56) References Cited

U.S. PATENT DOCUMENTS

| | | | | |
|---|---|---|---|---|
| 5,887,356 A * | 3/1999 | Sheldon | ................ | G01B 7/012 |
| | | | | 33/559 |
| 6,286,225 B1 * | 9/2001 | Schimmels | ............ | F16M 11/18 |
| | | | | 33/645 |
| 6,671,975 B2 * | 1/2004 | Hennessey | ............ | H02N 2/026 |
| | | | | 33/645 |
| 6,769,194 B2 * | 8/2004 | Hennessey | ................ | B25J 7/00 |
| | | | | 33/645 |
| 6,920,696 B2 * | 7/2005 | Sawada | ................ | H02N 2/0095 |
| | | | | 977/872 |
| 7,040,033 B2 * | 5/2006 | Zhu | ...................... | G01B 21/042 |
| | | | | 33/502 |
| 7,275,332 B2 * | 10/2007 | Blanding | ............... | F16M 11/06 |
| | | | | 33/573 |
| 7,627,956 B2 * | 12/2009 | Pettersson | ............ | G01B 5/012 |
| | | | | 33/503 |
| 8,627,576 B2 * | 1/2014 | Engel | .................. | G01B 21/045 |
| | | | | 33/503 |
| 9,038,282 B2 * | 5/2015 | McMurtry | ............ | G01B 7/012 |
| | | | | 33/503 |
| 2012/0048156 A1 * | 3/2012 | Zhang | ................ | F16M 11/121 |
| | | | | 108/91 |
| 2017/0108528 A1 * | 4/2017 | Atlas | ...................... | G01S 5/163 |
| 2017/0343336 A1 | 11/2017 | Lettau | | |
| 2018/0149469 A1 | 5/2018 | Becker | | |
| 2018/0321383 A1 | 11/2018 | Heidemann | | |
| 2021/0310794 A1 * | 10/2021 | Fuchs | ................ | G01B 21/047 |
| 2022/0262067 A1 * | 8/2022 | Kwiatkowski | .......... | G01S 7/481 |

\* cited by examiner

SIX DOF MEASUREMENT AID MODULE FOR DETERMINING 3D COORDINATES OF POINTS TO BE MEASURED OF AN OBJECT SURFACE

CROSS-REFERENCE TO RELATED APPLICATIONS

This application claims priority to European Patent Application No. 20167627.7, filed on Apr. 1, 2020. The foregoing patent application are incorporated herein by reference.

TECHNICAL FIELD OF THE INVENTION

The invention relates to a six DOF measurement aid module which can be used in conjunction with a laser tracker in order to determine 3D coordinates of points to be measured of an object surface.

BACKGROUND

In object measuring technology, various systems are known for determining 3D coordinates of points to be measured of an object surface, so-called surface points. Each system is based on the use of a specific measuring head/sensor that scans the object surface. In this context, the measuring task and in particular requirements defined therein regarding the measurement accuracy/speed prescribe the choice of measuring head/sensor to the greatest possible extent. There are principally two classes of measuring head/sensor types that are used when measuring objects: the measuring heads effecting tactile scanning and the measuring heads effecting non-contact scanning. Tactile measuring heads comprise for example a stylus-type measuring probe with a ruby sphere fixed at one end. The ruby sphere is brought into contact with a point to be measured of an object surface and the 3D coordinates of this point are ascertained on the basis of this. Measuring heads effecting non-contact scanning such as laser scanners, for example, comprise a beam source for emitting measurement radiation, wherein a point to be measured of an object surface is irradiated by the measurement radiation and measurement radiation is reflected from this irradiated point and the 3D coordinates of this point are ascertained on the basis of this. Most of these object measuring sensors or measuring heads effecting tactile or non-contact scanning were designed for use for example with a coordinate measuring machine (CMM), an automatically guided kinematic chain or a robot arm. That is to say that the measuring heads were designed to be coupled to a CMM, an automatically guided kinematic chain or a robot arm, whereby the measuring head, in an automatically guided and controlled manner, scans and measures an object surface to be measured.

DESCRIPTION OF THE INVENTION

What is lacking is a measurement aid module which increases the flexibility in the use of tactile measuring heads and measuring heads effecting non-contact scanning and at the same time increases the efficiency and accuracy of the measurement of object surfaces.

It is therefore an object of some aspects of the present invention to provide such a measurement aid module which enables flexible use both of measuring heads effecting tactile scanning and of measuring heads effecting non-contact scanning and at the same time increases the accuracy of the 3D coordinates determined and respectively the efficiency during the measurement of an object surface.

The measurement aid module according to some aspects of the invention is a measurement aid module which makes the pose, that is to say the position and orientation, of a measuring head/sensor/sensor attachment determinable in up to six degrees of freedom (six DOF). The six DOF measurement aid module is usable in a system for determining 3D coordinates of points to be measured of an object surface, said system comprising a laser tracker for determining the position and orientation of the six DOF measurement aid module. The invention relates to such a six DOF measurement aid module comprising a body comprising an object coupling device with an object interface, which object coupling device is configured to couple, via the object interface, alternatively both a handle to the body with a fixed pose and the body to a mobile platform with a fixed pose, a sensor attachment coupling device with a sensor interface, which sensor attachment coupling device is configured to couple alternatively both a sensor attachment effecting non-contact measurement and a sensor attachment effecting tactile measurement to the body with a fixed pose via the sensor interface, and visual markings, which are arranged in a defined spatial relationship in a manner forming a pattern in a marking region on the body and make the orientation of the six DOF measurement aid module determinable for the laser tracker.

In this case, a coupling device, i.e. both the object coupling device and the sensor coupling device, has in each case specific structural coupling features, wherein sensor attachments or respectively objects which are couplable to the corresponding coupling device have structural coupling features corresponding to said specific coupling features. These structural features corresponding to one another enable sensor attachments or respectively objects provided therefor to be coupled to and decoupled from the body in a specific manner, such that in the coupled state the sensor attachment or respectively the object, i.e. the handle or the mobile platform, has a defined pose relation with respect to the body. In this case, the pose relation relates to a specific position and orientation relative to the body.

In this case, the coupling devices, i.e. both the object coupling device and the sensor coupling device, have an interface specific to the coupling device—an object interface and respectively a sensor interface. These interfaces correspond to a respective interface counterpart at the respective couplable object and sensor attachment. Via the respective interface, the body and the coupled object or respectively the coupled sensor attachment are functionally connected to one another. In other words, typically data/information/signals can be transmitted and also electrical power can be conducted via the connection or via the interfaces. In this case, the respective interface can provide both a communicative connection—relating to e.g. data/information/signals—and an electrical connection between a coupled object and the six DOF measurement aid module or respectively a coupled sensor attachment and the six DOF measurement aid module. In this case, data/information/signals can be transmitted both from the coupled object or respectively sensor attachment to the six DOF measurement aid module and vice versa.

The coupling of a handle makes the six DOF measurement aid module usable in a manually guided mode. By means of the coupling of the body to an automatically guided mobile platform, the six DOF measurement aid module is usable in an automatically guided mode, for example.

A sensor attachment effecting non-contact measurement can be e.g. a laser-scanner-based sensor attachment, a white-light-scanner-based sensor attachment or else a non-contact non-scanning sensor attachment for distance measurement.

In the case of the sensor attachments effecting tactile measurement, the determination of the distance to a surface point is based on the contact thereof with an end of a stylus, for example. Upon contact, the distance to the surface point is determinable by way of the geometry of the stylus and the end thereof.

In this case, both the sensor attachments effecting non-contact measurement and the sensor attachments effecting tactile measurement ascertain coordinate information as measurement information, and on the basis thereof 3D coordinates of surface points to be measured are determinable by a laser tracker.

Furthermore, the six DOF measurement aid module comprises visual markings in a marking region. The visual markings are arranged in a defined spatial relationship with respect to one another and thereby form a specific pattern that serves to make the orientation of the body and thus of the six DOF measurement aid module determinable for a laser tracker. The visual markings can be light spots, for example.

The six DOF measurement aid module according to the invention enables flexible use, in a manually guided manner and in an automatically guided manner, both of measuring heads effecting tactile scanning and of measuring heads effecting non-contact scanning and at the same time enables 3D coordinates of surface points to be determined highly precisely.

In accordance with one embodiment, the sensor attachment coupling device can comprise: a first coupling part with a first coupling part interface, which first coupling part is configured to couple at least one sensor attachment effecting non-contact measurement to the body with a fixed pose via the first coupling part interface, and a second coupling part with a second coupling part interface, which second coupling part is configured to couple at least one sensor attachment effecting tactile measurement to the body with a fixed pose via the second coupling part interface.

In accordance with one embodiment, the interfaces can provide a communicative connection between coupled sensor attachment and six DOF measurement aid module, and respectively between handle or mobile platform and the six DOF measurement aid module. The six DOF measurement aid module can then be configured, for the purpose of determining 3D coordinates of points to be measured of an object surface, to provide to the laser tracker coupling information relating to a coupled and a decoupled state as coupling state, and the identification of a coupled sensor attachment, of a coupled handle or of a coupled mobile platform, and measurement information, and to display the pattern formed by the visual markings.

The term interfaces is taken to mean the apparatus interface, the object interface and optionally the coupling part interfaces. The communicative connection is provided between coupled sensor attachment and the six DOF measurement aid module, and respectively between the coupled object, i.e. a handle or a mobile platform, and the six DOF measurement aid module. The term coupling devices is taken to mean the object coupling device and the sensor attachment coupling device.

In this case, the communicative connection enables a data/information/signal exchange between a coupled object or respectively sensor attachment and the six DOF measurement aid module in both directions. In this case, coupling information comprises information which makes the coupling status of a coupling device—i.e. is an object or respectively a sensor attachment coupled or not—recognizable for a laser tracker. The coupling information likewise comprises information which makes a coupled object or respectively a coupled sensor attachment identifiable for a laser tracker. In this case, measurement information comprises coordinate information which is ascertained by the sensor attachments and, on the basis of this, 3D coordinates are determinable for the laser tracker. By way of example, coordinate information can be based on distances to a surface point to be measured, which distances are determined by a sensor attachment effecting non-contact measurement. The measurement information can likewise comprise signals, for example trigger signals, which can be receivable by the sensor attachments. Such trigger signals can be generated e.g. by a trigger mechanism of a coupled handle or else by a laser tracker. The respective coupling device can also be configured to provide coupling information and/or measurement information to the laser tracker via the six DOF measurement aid module or directly.

In accordance with one embodiment, the six DOF measurement aid module can comprise at least one sensor attachment from a group of sensor attachments comprising sensor attachments effecting non-contact measurement, in particular a laser scanner sensor attachment, and sensor attachments effecting tactile measurement.

In accordance with one embodiment of the six DOF measurement aid module, the handle can comprise an actuatable trigger mechanism, which generates a trigger signal as measurement information upon actuation.

The trigger mechanism can be embodied e.g. in the form of an actuatable button or an actuatable key. The trigger signal thus generated can then be provided to a sensor attachment via the object interface and sensor interface, and the sensor attachment ascertains coordinate information on the basis of this.

In accordance with a further embodiment, the six DOF measurement aid module can be configured in the case of a coupled tactile sensor attachment, on the basis of a trigger signal generated by actuation of the trigger mechanism, to provide to the laser tracker coordinate information as measurement information for determining 3D coordinates of points to be measured of an object surface, and in the case of a coupled sensor attachment effecting non-contact measurement, in particular a laser scanner sensor attachment, to continuously provide to the laser tracker coordinate information as measurement information for determining 3D coordinates of points to be measured of an object surface, wherein continuously provided coordinate information is marked on the basis of an actuation of the trigger mechanism.

In accordance with a further embodiment of the six DOF measurement aid module, the visual markings can be light spots.

Said light spots can be generated for example by a light source at the respective points or by means of reflection of light provided therefor at the respective points. Likewise, the light from a single light source can be guided to the respective points via optical waveguides. Said light spots generate an orientation-specific pattern which makes the orientation of the six DOF measurement aid module determinable for a laser tracker.

In accordance with one embodiment of the six DOF measurement aid module, the body can comprise a reflector, which is assigned to the visual markings and makes the position of the six DOF measurement aid module determinable for a laser tracker.

The reflector, e.g. a retroreflector, is typically designed to reflect radiation that is incident on it in the direction of the beam source. The radiation reflected by the reflector makes the position of the six DOF measurement aid module determinable for a laser tracker. By way of example, the reflector can be irradiated with laser radiation of a laser tracker, which is then reflected by the reflector in the direction of the laser tracker. On the basis of the detection of the reflected laser radiation, the laser tracker can determine the exact angles at which the reflector is irradiated. On the basis of laser radiation reflected by the reflector, the distance to the reflector can likewise be determinable for a laser tracker. On the basis of the angle information relating to the direction of the emitted laser radiation and the determined distance to the reflector, the position of the reflector and thus of the six DOF measurement aid module is determinable for the laser tracker.

The coupling devices can be connected to the body in a detachable manner, wherein, both in a decoupled coupling state of the sensor attachment coupling device and with the sensor attachment coupling device detached, the visual markings and the reflector make a pose determinable for a laser tracker in up to six degrees of freedom of an object coupled to the object coupling device.

In accordance with a further embodiment, the sensor attachment coupling device can furthermore be designed to couple a sensor attachment to the body via an adapter piece, which is connectable to the sensor attachment with a fixed pose, in an orientation and position defined relative to the sensor attachment coupling device by the adapter piece, and the coupling information furthermore relates to information concerning the defined orientation and position of the sensor attachment relative to the sensor attachment coupling device.

In accordance with one embodiment, the six DOF measurement aid module can be configured, in a state coupled to an automatically guided mobile platform with a collision prevention system, to provide coupling information via the object interface to the collision prevention system for preventing collisions within a movement space of the automatically guided mobile platform with coupled six DOF measurement aid module.

In this case, the six DOF measurement aid module is used in an automatically guided mode. In this case, the automatically guided mobile platform can comprise an associated collision prevention system. Said collision prevention system serves to monitor the defined movement space within which the mobile platform is automatically movable. The monitoring can be provided e.g. by means of proximity sensors, the sensor fields of view of which cover at least the defined movement space of the robot arm. Such proximity sensors serve to detect the presence of objects and/or human beings within the determined movement space, wherein detection of these has the effect that the collision prevention system causes either the automatically guided mobile platform to carry out slower movements or the movement to be totally interrupted. The movement space of the automatically guided mobile platform is extended as a result of the construction with a coupled six DOF measurement aid module. The shape in which said movement space is extended depends here on the construction, i.e. on the six DOF measurement aid module and sensor attachments coupled thereto. In this case, the six DOF measurement aid module can be configured to provide coupling information to the collision prevention system, such that on the basis thereof the collision prevention system can extend the movement space of the automatically guided mobile platform according to the construction. In this case, the coupling information can relate to information about the geometric configuration of the sensor attachment and the pose relation thereof with respect to the six DOF measurement aid module.

In accordance with one embodiment, the six DOF measurement aid module can comprise a feed for supplying the six DOF measurement aid module with electrical power, wherein the feed is provided via the object interface, and is designed to feed the electrical power alternatively both via a battery power source and via a grid system power source.

In accordance with a further embodiment, the feed can connect a power source to the six DOF measurement aid module alternatively both via the coupled handle and via the coupled mobile platform and thus via the object interface.

In accordance with a further embodiment, the feed can be configured to supply the visual markings, in particular the light spots, and sensor attachments coupled via the sensor attachment coupling device, and thus via the sensor interface, with electrical power.

In accordance with a further embodiment, the six DOF measurement aid module can have a consumer power regulating functionality with power supply display, wherein the consumer power regulating functionality identifies a power source connected for the feed and displays it by means of the power supply display, and, in the case of a connected battery power source, furthermore ascertains a charge level of the battery power source and displays it by means of the power supply display and regulates the power consumption of the six DOF measurement aid module on the basis of the charge level.

Via the power supply display, the consumer power regulating functionality can display a connected power source identifiably for a user for example by means of status LEDs, an alphanumeric display or some other display device arranged on the body. In the case of a connected battery power source, the consumer power regulating functionality can likewise display the present charge level of the battery via the power supply display and at the same time regulate the consumer power on the basis of the charge level. Thus, for example the brightness of the visual markings embodied as light spots can be reduced in order to regulate the consumer power. Likewise, it is also possible to adapt sensor-attachment-specific parameters on the basis of the charge level of the battery in order to regulate the consumer power.

Some aspects of the invention likewise relate to a six DOF measuring system comprising a six DOF measurement aid module according to the invention and a laser tracker having a position and orientation determining functionality for determining a position and orientation of the measurement aid module, wherein the laser tracker is configured, on the basis of coupling information relating to a coupled and decoupled state of a sensor attachment, of a handle or of a mobile platform, and the identification of a coupled sensor attachment, of a coupled handle or of a coupled mobile platform, measurement information, and the pattern formed by the visual markings, to determine 3D coordinates of points to be measured of an object surface.

In this case, the laser tracker typically comprises a base and an upper part with a telescope, said upper part being movable relative to the base. The telescope is designed to emit laser radiation in the direction of a cooperative target/target point that can be sighted, for example a reflector, at a determinable angle. The laser tracker typically likewise comprises detection units and a computing unit connected to the detection units. The detection units are designed, inter alia, to detect laser radiation that is reflected from a target point sighted and, on the basis of this, to determine the angles at which a target point is sighted and to ascertain a distance to the target point sighted. A detection unit of the laser tracker can likewise be embodied as an image capturing unit having image evaluation functionality. Said image capturing unit can comprise for example a camera sensor configured to project or image patterns formed by visual markings onto a plane. By means of the image evaluation functionality, the computing unit can identify an orientation-specific pattern or assign a change in the pattern to a change in the orientation of the six DOF measurement aid module. The laser tracker typically has a pose determining functionality based for example on an image capturing unit having image evaluation functionality.

Some aspects of the invention likewise relate to a computer program product comprising program code which, when the latter is executed, instructs a computer or a plurality of computing units connected to form a computer, on the basis of coupling information relating to a coupled and decoupled state of a sensor attachment, of a handle or of a mobile platform, and the identification of a coupled sensor attachment, of a coupled handle or of a coupled mobile platform, measurement information, and a pattern formed by visual markings, of a six DOF measurement aid module according to the invention, to determine 3D coordinates of points to be measured of an object surface, and in particular—in the case where the body is coupled to an automatically guided mobile platform with a collision prevention system—to provide coupling information to the collision prevention system for preventing collisions within a movement space of the automatically guided mobile platform with coupled six DOF measurement aid module.

The computer can also be instructed—in the case of an object coupled to the object coupling device—to determine a pose of the coupled object in up to six degrees of freedom alternatively both in a decoupled coupling state of the sensor attachment coupling device and with the sensor attachment coupling device detached.

BRIEF DESCRIPTION OF THE FIGURES

The six DOF measurement aid module according to the invention is described in greater detail purely by way of example below on the basis of concrete exemplary embodiments illustrated schematically in the figures, further advantages of the invention also being discussed. Specifically in the figures.

DETAILED DESCRIPTION OF THE INVENTION

Figure 1:
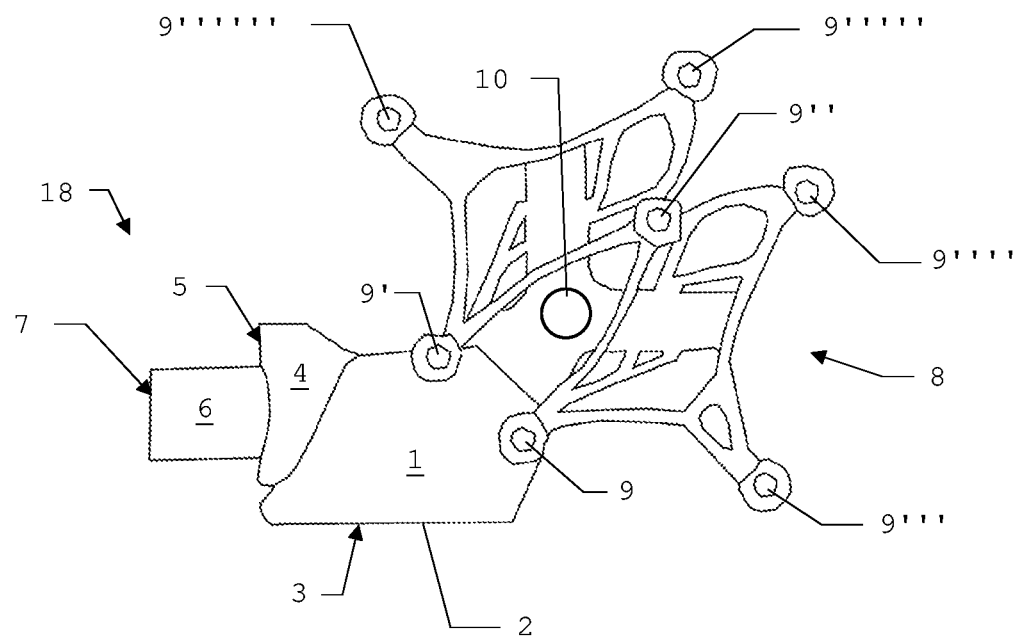
FIG. 1 shows a six DOF measurement aid module in accordance with one embodiment.

FIG. 1 shows by way of example a six DOF measurement aid module in accordance with one possible embodiment. In this case, the designation six DOF is to be understood in the sense that the measurement aid module makes it possible to determine the orientation and position, i.e. the pose, of the device as shown in FIG. 1 and thus also of objects and respectively sensor attachments coupled to the device, in up to six degrees of freedom (six DOF). The six DOF measurement aid module comprises a body/base body/module body 1 comprising an object coupling device 2 with an object interface 3, a sensor attachment coupling device 18 comprising a first coupling part 4 with a first coupling part interface 5 and a second coupling part 6 with a second coupling part interface 7. A coupling device has specific structural coupling features in each case, wherein sensor attachments or respectively objects which can be coupled to the corresponding coupling device have structural coupling features corresponding to said specific coupling features. These structural features corresponding to one another enable sensor attachments and respectively objects provided therefor to be coupled to or decoupled from the body 1 in a specific manner, such that in the coupled state the sensor attachment or respectively the object has a defined pose relation with respect to the body 1. In this case, the pose relation relates to a specific position and orientation relative to the body 1. As shown schematically in FIG. 1, the coupling devices are arranged at different regions on the body 1 and have a defined pose relation with respect to the body. Each of the coupling devices is designed to couple a specific type of sensor attachments or objects. In this regard, the object coupling device 2 shown in FIG. 1 is designed alternatively both to couple a handle 11 to the body 1 and to couple the body 1 to an object, such as a mobile platform, for example. The coupling of a handle 11 serves for using the six DOF measurement aid module in a manually guided mode. By means of the coupling of the body to an automatically guided mobile platform, the six DOF measurement aid module can be used in an automatically guided mode, for example. Besides the object coupling device, the body 1 comprises two coupling parts 4 and 6, wherein the two coupling parts are designed to couple both sensor attachments effecting tactile measurement and sensor attachments effecting non-contact measurement to the body. In this case, the first coupling part 4 is designed to couple at least laser-scanner-based sensor attachments 13 effecting non-contact measurement to the body 1. Laser-scanner-based sensor attachments use a laser light source for generating distance measurement radiation, which is then emitted at specific angles in the direction of the object surface. Said distance measurement radiation is scanned over the object surface to be measured, such that the points to be measured of the object surface are scanned by the distance measurement radiation. Part of said distance measurement radiation is then reflected from the surface points in the direction of the laser-scanner-based sensor attachment and is detected by the latter in a distance-sensitive manner. The distance-sensitive detection can be based for example on one of the principles of either triangulation or optionally time-of-flight measurement. Distances to the points to be measured of the object surface are ascertained in this way. On the basis of the distances thus ascertained and the referenced position and orientation of the laser-scanner-based sensor attachment, 3D coordinates of the scanned surface points then become determinable. The second coupling part 6 is designed to couple at least sensor attachments effecting tactile measurement to the body 1. In the case of the sensor attachments effecting tactile measurement, the determination of the distance to a surface point is based on the contact thereof with an end of a stylus, for example. Upon contact, the distance to the surface point is determinable by way of the geometry of the stylus and the end thereof. In this case, each of the coupling devices described comprises an interface specific to the coupling device—a coupling part interface 5, 7 and respectively an object interface 3. This interface corresponds to an interface counterpart at the respective couplable sensor attachment or object. Via the respective interface, the body 1 and the coupled sensor attachment or respectively the coupled object are functionally connected to one another. In other words, data/information/signals can be transmitted and also electrical power can be conducted via the connection or via the interfaces. In this case, the respective interface enables a communication—relating to e.g. data/information/signal—and also electrical connection between a coupled sensor attachment and the measurement aid module or respectively between a coupled object and the measurement aid module. Furthermore, the six DOF measurement aid module comprises visual markings 9, 9', 9", 9''', 9"", 9''''', 9"""" in a marking region 8. The visual markings are arranged in a defined spatial relationship with respect to one another and thereby form a specific pattern that serves to make the orientation of the body determinable for a laser tracker. The marking region can be defined e.g. by a mount that is connected to the body fixedly and with a fixed pose via a corresponding interface. On account of the connection to the body with a fixed pose, the orientation of the body is then also determinable by a laser tracker by means of the visual markings. As shown by way of example in FIG. 1, the visual markings 9, 9', 9", 9''', 9"", 9''''', 9"""" can be light spots, wherein a specific group of light spots is assigned respectively to a view of the six DOF measurement aid module. Said light spots can be generated for example by a light source at the respective points or by means of reflection of light provided therefor at the respective points. Likewise, the light from a single light source could be guided to the respective points via optical waveguides. Said light spots generate an orientation-specific pattern that can be used by a laser tracker for determining the orientation of the six DOF measurement aid module. For this purpose, for example, the light spot pattern can be projected or imaged onto a plane for the purpose of evaluation. The determination of the orientation of the six DOF measurement aid module is then based for example on the fact that the pattern composed of the light spot projections changes in an orientation-specific manner depending on the orientation. By way of example, the light spot projections of two light spots approach one another or move away from one another during a rotation of the six DOF measurement aid module about an axis which is arranged transversely with respect to the connecting axis connecting the two light spots to one another and at the same time lies in a plane arranged parallel to the projection plane. Furthermore, the six DOF measurement aid module shown in FIG. 1 comprises a reflector 10 designed to reflect radiation that is incident on it. The radiation reflected by the reflector 10 makes the position of the six DOF measurement aid module determinable for a laser tracker. By way of example, the reflector can be irradiated with laser radiation of a laser tracker, which is then reflected by the reflector in the direction of the laser tracker. On the basis of the detection of the reflected laser radiation, the laser tracker can determine the exact angles at which the reflector is irradiated. On the basis of laser radiation reflected by the reflector, the distance to the reflector can likewise be ascertained. On the basis of the angle information relating to the direction of the emitted laser radiation and the determined distance to the reflector, the position of the reflector and thus of the six DOF measurement aid module can be determined. Furthermore, a computing unit is assigned to the six DOF measurement aid module. The computing unit can comprise a plurality of subunits. The six DOF measurement aid module can also comprise subunits of the computing unit. The computing unit is communicatively connected to the interfaces. In this case, the communicative connection can be effected in a wired, conductor-track-based or else wireless manner. This communicative connection enables a signal/data/information exchange between the computing unit and the sensor attachments and respectively objects coupled to the body and optionally also between the computing unit and the visual markings. These exchangeable signals/data/information items can comprise for example coupling information relating to coupled and decoupled coupling states and the identification of a coupled sensor attachment and respectively object. Furthermore, these exchangeable signals/data/information items can relate for example to measurement information generated by the sensor attachments or else signals generated by coupled objects. This enables for the computing unit a highly precise determination of 3D coordinates of points to be measured of an object surface on the basis of coupling information, measurement information and on the basis of the pattern formed by the visual markings. The specific combination of the coupled sensor attachments and objects provides an extremely flexible use of both sensor attachments effecting tactile measurement and sensor attachments effecting non-contact measurement, wherein the six DOF measurement aid module enables 3D coordinates of points to be measured of an object surface to be determined highly precisely.

Figure 2:
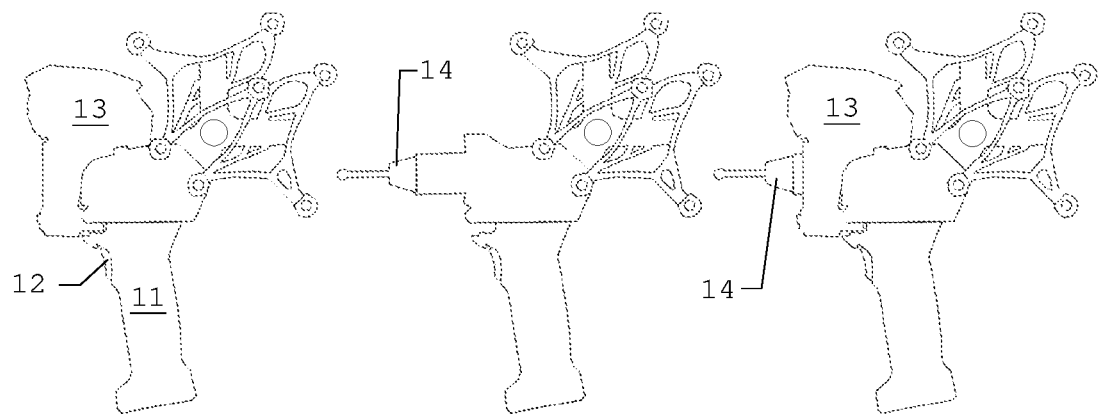
FIG. 2 shows the six DOF measurement aid module in accordance with further embodiments in different coupling states.

FIG. 2 shows the body 1 with a handle 11 with trigger mechanism 12, said handle being coupled to the object coupling device. As illustrated schematically in FIG. 2, different sensor attachments can be coupled to the body via the coupling parts. In this regard, via the first coupling part, e.g. a laser-scanner-based sensor attachment 13 can be coupled to the body with a fixed pose, wherein the second coupling part has the decoupled coupling state. Likewise, for example the first coupling part can have the decoupled state, wherein a sensor attachment 14 effecting tactile measurement is coupled to the body via the second coupling part. Likewise, both coupling parts can simultaneously couple a respective sensor attachment to the body with a fixed pose. The configurations such as are shown in FIG. 2 correspond to configurations designed for the use of the six DOF measurement aid module in a manually guided mode. For this purpose, the handle 11 comprises the trigger mechanism 12 in the form of a button or a key on which triggerlike actuation can be effected. The button can also be attached to the body itself. There can be different types/variants of the actuation. By way of example, the simplest form of an actuation of the trigger mechanism relates to one-off actuation. In this case, the button or the key is pressed in a triggerlike manner and then released again. A different variant of the actuation of the trigger mechanism relates for example to the button or key being kept pressed for a specific trigger period. Upon actuation of the trigger mechanism, the latter generates a trigger signal as measurement information, wherein e.g. the computing unit recognizes and determines the variant of the actuation on the basis of said trigger signal. With the handle 11 coupled and depending on the coupled sensor attachments, the computing unit can e.g. furthermore determine the 3D coordinates of points to be measured of an object surface on the basis of the trigger signal or on the basis of the trigger signals. Proceeding from a configuration as shown in the middle in FIG. 2, in which a sensor attachment effecting tactile measurement is coupled to the body, the computing unit recognizes this sensor attachment effecting tactile measurement and also the coupled handle with trigger mechanism. Upon one-off actuation of the trigger mechanism, the computing unit can then determine the 3D coordinates of a surface point that is in contact with the ruby sphere of the stylus. As a further example, proceeding from a configuration as shown on the left in FIG. 2, in which a laser-scanner-based sensor attachment is coupled to the body, the 3D coordinates of surface points to be measured can likewise be determined on the basis of the actuation of the trigger mechanism. By way of example, the computing unit recognizes the laser-scanner-based sensor attachment and the coupled handle with trigger mechanism. The computing unit then begins to continuously generate or determine coordinate information of points scanned by the distance measurement beam of the laser-scanner-based sensor attachment. On the basis of a trigger signal generated by the actuation of the trigger mechanism, coordinate information generated continuously in this way can then be marked as coordinate information of points to be measured. The marking as coordinate information of points to be measured takes place e.g. for the duration of a trigger period. Afterward, the continuously generated coordinate information is no longer marked as coordinate information of points to be measured, but rather is merely further generated continuously as coordinate information of scanned points. What is crucial here is that the trigger period can be determined on the basis of one or more trigger signals. There can be a plurality of variants of the actuation of the trigger mechanism, wherein the trigger signals generated by the respective variant determine the trigger period. By way of example, the computing unit can determine the period between a first one-off actuation of the trigger mechanism and a second one-off actuation of the trigger mechanism as the trigger period. Alternatively, the computing unit can determine the period during which the trigger mechanism or the key/button is kept pressed as the trigger period. If no handle with trigger mechanism is coupled to the body, then the trigger signal can also be generated by the computing unit. If a sensor attachment effecting tactile measurement is coupled to the body, then a trigger signal can also be generated on the basis of the contact of the measuring sensor attachment end with the surface.

Figure 3:
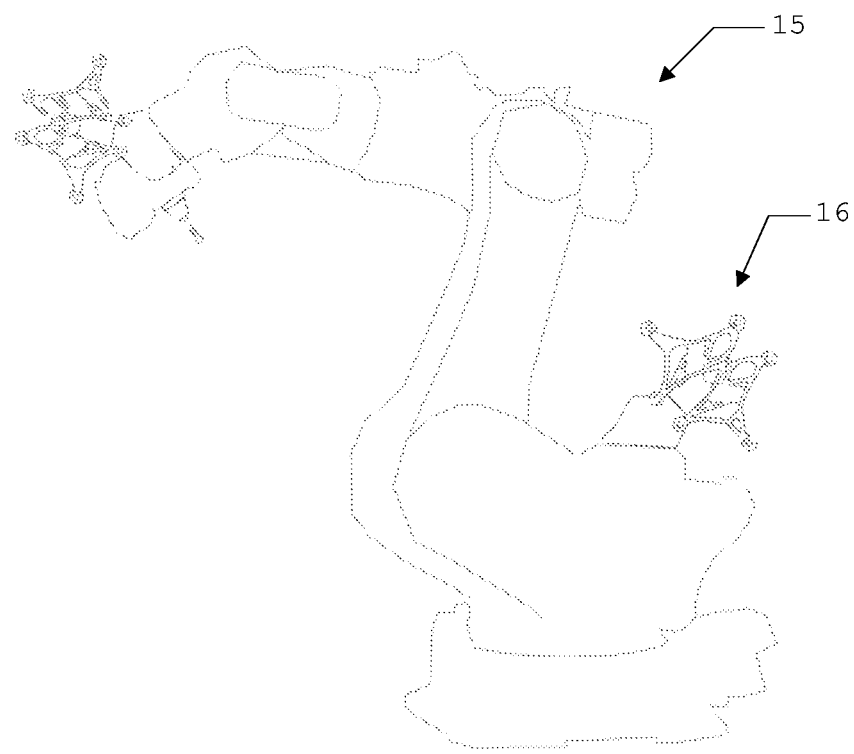
FIG. 3 shows the six DOF measurement aid module in accordance with a further coupling state.

According to the invention, the object coupling device is also configured to couple the body to a mobile platform, for example to an end of a robot arm 15, as shown schematically in FIG. 3. In this configuration, the six DOF measurement aid module is used in an automatically guided mode. Such a robot arm as shown schematically in FIG. 3 either can be moved automatically in a cage provided therefor, the cage preventing collisions from occurring between the moving robot arm and objects or human beings by keeping the latter away from the movement space of the robot arm, or alternatively can be operated without such a cage. If such a robot arm is operated without a cage, then the robot arm is usually equipped with a collision prevention system that prevents collisions instead of the cage. The robot arm has, according to its construction, a specific movement space within which it carries out movements. The collision prevention system of the robot arm comprises e.g. proximity sensors, the sensor fields of view of which cover at least the defined movement space of the robot arm. Said proximity sensors serve to detect objects and human beings within the determined movement space, wherein upon their detection the collision prevention system instructs the robot arm either to carry out slower movements or to totally interrupt the movements. As mentioned briefly, said determined movement space is prescribed by the design of the robot arm, in particular the maximum possible "extension" thereof. If, as shown in FIG. 3, the body is then coupled to such a robot arm 15 which is not operated in a cage, the movement space of the robot arm is extended on account of the construction. In this case, the way in which said movement space of the robot arm changes is also dependent on the sensor attachments coupled to the body. The computing unit assigned to the six DOF measurement aid module can be configured, in such a case, to instruct the collision prevention system of the robot arm to extend the determined movement space such that the extended movement space concomitantly includes movements of the robot arm with coupled body with coupled sensor attachments. The instruction is effected here on the basis of coupling states and coupling information. The instruction has the effect that the proximity sensors, with their sensor fields of view, observe a correspondingly extended movement space relating to the presence of an object and/or a human being therein. In the case where the body is coupled to a mobile platform such as a robot arm, for example, a trigger signal can also be generated by the computing unit or the robot arm, wherein the trigger signal instructs a coupled sensor attachment to ascertain coordinate information.

A further embodiment of the six DOF measurement aid module is likewise shown schematically in FIG. 3. In accordance with this embodiment, the coupling devices can be connected to the body in a detachable manner. In accordance with this embodiment, the coupling parts can be detached, for example, as a result of which the body becomes more slender and more handleable and is also usable in a manner allowing more space to be saved. This body 16 having shed the coupling parts can be coupled via the object coupling device to a mobile platform or for example to the base of a robot or robot arm, as shown in FIG. 3, wherein an exact positioning of the robot or robot arm is made possible by way of the determination of the position and orientation of the six DOF measurement aid module.

Figure 4:
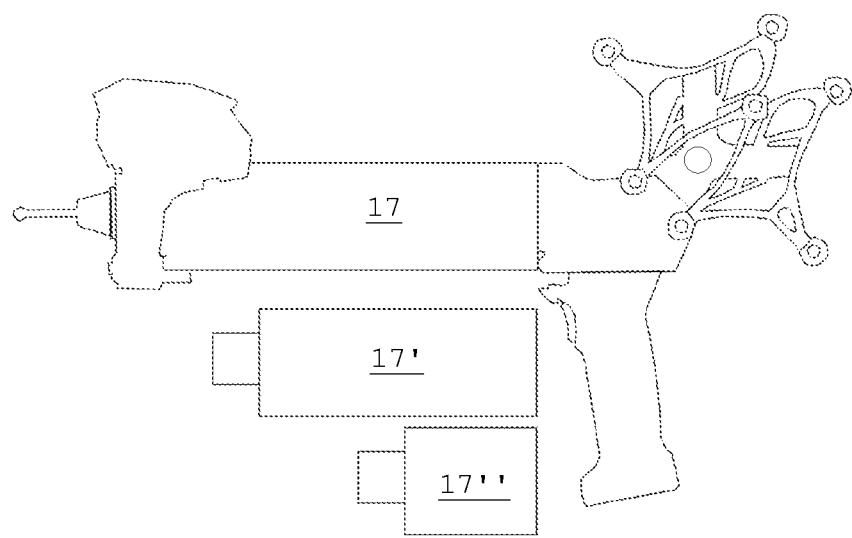
FIG. 4 shows a further embodiment of the six DOF measurement aid module.

FIG. 4 schematically shows a further embodiment of the six DOF measurement aid module. In accordance with this embodiment, the two coupling parts can furthermore be configured to couple the respective sensor attachments to the body with a fixed pose via a variable adapter piece 17, 17', 17". In the coupled state, the respective sensor attachment is situated in a defined orientation and position with respect to the body on account of the design of the adapter. The information relating to the design of the adapter piece and thus relating to the orientation and position of the sensor attachment in relation to the body, said sensor attachment being coupled to the body via the adapter piece, can be provided to the computing unit in the form of coupling information. On the basis of said coupling information, the computing unit can determine coordinate information of surface points to be measured by means of sensor attachments coupled to adapter pieces.

Advantageously, the six DOF measurement aid module is used in conjunction with a laser tracker and is also designed therefor. In such a measuring system comprising six DOF measurement aid module and laser tracker, the laser tracker usually comprises a base and an upper part with a telescope, said upper part being movable relative to the base. The telescope is designed to emit laser radiation in the direction of a cooperative target/target point that can be sighted, for example a reflector, at a determinable angle. The laser tracker likewise comprises detection units and a computing unit connected to the detection units. The detection units are designed, inter alia, to detect laser radiation that is reflected from a target point sighted and, on the basis of this, to determine the angles at which a target point is sighted and to ascertain a distance to the target point sighted. A detection unit of the laser tracker can likewise be embodied as an image capturing unit having image evaluation functionality. Said image capturing unit can comprise for example a camera sensor configured to project or image patterns formed by visual markings onto a plane. By means of the image evaluation functionality, the computing unit can identify an orientation-specific pattern or assign a change in the pattern to a change in the orientation of the six DOF measurement aid module. The laser tracker typically has a pose determining functionality based for example on an image capturing unit having image evaluation functionality, as described above.

The computing unit of the laser tracker can thus be configured to determine 3D coordinates of points to be measured of a surface on the basis of the determined position of the six DOF measurement aid module, the determined orientation of the six DOF measurement aid module, the coupling information and the measurement information.

The six DOF measurement aid module can likewise comprise a feed. Said feed can serve, inter alia, to supply coupled sensor attachments and optionally also the visual markings with electrical power. In this case, the feed is effected via the object interface of the object coupling device and can be connected alternatively both to a battery power source and to a grid system power source. With a handle coupled, for example, the handle can have a cable connection to a grid system power source, wherein the electrical power is fed via the handle and via the object interface of the object coupling device. The handle can nevertheless alternatively be connected to a battery as power source. If the body is coupled to a mobile platform, for example, the power supply can also be effected via a power source connected to the mobile platform.

The six DOF measurement aid module can likewise comprise a consumer power regulating functionality with a power supply display. Via the power supply display, the consumer power regulating functionality can display a connected power source identifiably for a user for example by means of status LEDs, an alphanumeric display or some other display device arranged on the body. In the case of a connected battery power source, the consumer power regulating functionality can likewise display the present charge level of the battery via the power supply display and at the same time regulate the consumer power on the basis of the charge level. Thus, for example the brightness of the visual markings embodied as light spots could be reduced in order to regulate the consumer power. Likewise, it is also possible to adapt sensor-attachment-specific parameters on the basis of the charge level of the battery in order to regulate the consumer power.

The invention likewise relates to a computer program product comprising program code. If the program code of the computer program product is executed on a computing unit, the latter is instructed to determine 3D coordinates of points to be measured. The determination of the 3D coordinates is effected by the computing unit as part of a six DOF measuring system described. The computing unit is instructed to ascertain coupling information, measurement information and patterns formed by visual markings and to determine on the basis thereof 3D coordinates of points to be measured. If for example a handle with trigger mechanism is coupled to the body, then the computing unit is instructed to determine the 3D coordinates furthermore on the basis of a trigger signal generated by the trigger mechanism. If the body is coupled for example via the object coupling device to an end effector as part of an automatically guided robot arm, then the computing unit is furthermore instructed, on the basis of coupling information of the sensor attachment coupling device, to extend a defined movement space of the robot arm to form an extended movement space such that the extended movement space concomitantly includes movements of the robot arm with coupled sensor attachment. If the body is coupled via the object coupling device to an object, for example to the base of a mobile robot arm, then the computing unit is instructed to ascertain coupling states of the sensor attachment coupling device. If a decoupled state is signaled to the computing unit by the sensor attachment coupling device or if the sensor attachment coupling device is not situated on the body, then the computing unit is instructed to determine highly precisely the position and/or orientation of the coupled object on the basis of the pattern formed by the visual markings in up to six degrees of freedom.

Figure 5:
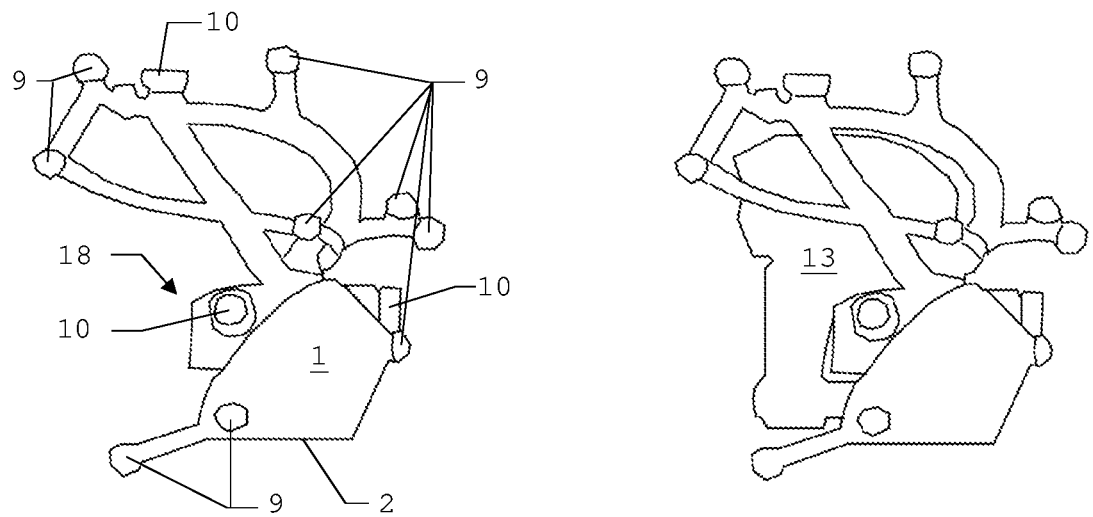
FIG. 5 shows a further possible embodiment of the six DOF measurement aid module.
Figure 6:
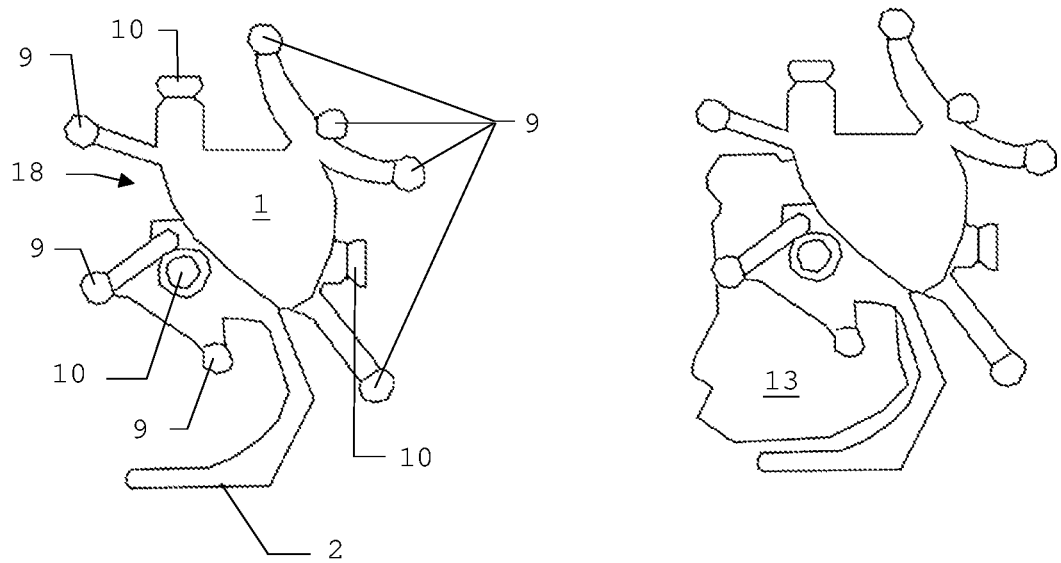
FIG. 6 shows a further possible embodiment of the six DOF measurement aid module.

FIGS. 5 and 6 show further possible configurations of a six DOF measurement aid module according to the invention.

It goes without saying that these illustrated figures merely schematically illustrate possible exemplary embodiments. According to the invention the various approaches can likewise be combined with one another and also with optical measurement concepts or coordinate measuring machines from the prior art.

What is claimed is:

1. A six degree-of-freedom (DOF) measurement aid module for use in a system for determining three-dimensional (3D) coordinates of points to be measured of an object surface, said system comprising a laser tracker for determining the position and orientation of the six DOF measurement aid module, comprising:
   a body comprising:
      an object coupling device with an object interface, which object coupling device is configured to couple, via the object interface, alternatively both a handle to the body with a fixed pose and the body to a mobile platform with a fixed pose,
      a sensor attachment coupling device with a sensor interface, which sensor attachment coupling device is configured to couple alternatively both a sensor attachment effecting non-contact measurement and a sensor attachment effecting tactile measurement to the body with a fixed pose via the sensor interface, and
      visual markings, arranged in a defined spatial relationship in a manner forming a pattern in a marking region on the body and make the orientation of the six DOF measurement aid module determinable for the laser tracker.

2. The six DOF measurement aid module according to claim 1, wherein the sensor attachment coupling device comprises:
   a first coupling part with a first coupling part interface, which first coupling part is configured to couple at least one sensor attachment effecting non-contact measurement to the body with a fixed pose via the first coupling part interface, and
   a second coupling part with a second coupling part interface, which second coupling part is configured to couple at least one sensor attachment effecting tactile measurement to the body with a fixed pose via the second coupling part interface.

3. The six DOF measurement aid module according to claim 1, wherein:
the interfaces provide a communicative connection between coupled sensor attachment and six DOF measurement aid module, and respectively between handle or mobile platform and the six DOF measurement aid module,
the six DOF measurement aid module is configured, for the purpose of determining 3D coordinates of points to be measured of an object surface, to provide to the laser tracker
coupling information relating to:
a coupled and a decoupled state as coupling state, and
the identification of a coupled sensor attachment, of a coupled handle or of a coupled mobile platform, and
measurement information,
and wherein the six DOF measurement aid module is further configured to display the pattern formed by the visual markings.

4. The six DOF measurement aid module according to claim 1, wherein the six DOF measurement aid module comprises at least one sensor attachment from a group of sensor attachments comprising:
a. sensor attachments effecting non-contact measurement, and
b. sensor attachments effecting tactile measurement.

5. The six DOF measurement aid module according to claim 4, wherein the handle comprises an actuatable trigger mechanism, which generates a trigger signal as measurement information upon actuation.

6. The six DOF measurement aid module according to claim 5, wherein the six DOF measurement aid module is configured:
a. in the case of a coupled tactile sensor attachment, on the basis of a trigger signal generated by actuation of the trigger mechanism, to provide to the laser tracker coordinate information as measurement information for determining 3D coordinates of points to be measured of an object surface, and
b. in the case of a coupled sensor attachment effecting non-contact measurement, to continuously provide to the laser tracker coordinate information as measurement information for determining 3D coordinates of points to be measured of an object surface, wherein continuously provided coordinate information is marked on the basis of an actuation of the trigger mechanism.

7. The six DOF measurement aid module according to claim 4, wherein:
a. the sensor attachment coupling device is furthermore designed to couple a sensor attachment to the body via an adapter piece, which is connectable to the sensor attachment with a fixed pose, in an orientation and position defined relative to the sensor attachment coupling device by the adapter piece, and
b. the coupling information furthermore relates to information concerning the defined orientation and position of the sensor attachment relative to the sensor attachment coupling device.

8. The six DOF measurement aid module according to claim 4, wherein the six DOF measurement aid module is configured, in a state coupled to an automatically guided mobile platform with a collision prevention system, to provide coupling information via the object interface to the collision prevention system for preventing collisions within a movement space of the automatically guided mobile platform with coupled six DOF measurement aid module.

9. The six DOF measurement aid module according to claim 1, wherein the visual markings are light spots.

10. The six DOF measurement aid module according claim 1,
wherein the body further comprises a reflector, which is assigned to the visual markings and makes the position of the six DOF measurement aid module determinable for a laser tracker.

11. The six DOF measurement aid module according to claim 1, further comprising a feed for supplying the six DOF measurement aid module with electrical power, wherein the feed:
a. is provided via the object interface, and
b. is configured to feed the electrical power alternatively both via a battery power source and via a grid system power source.

12. The six DOF measurement aid module according to claim 11, wherein the feed connects a power source to the six DOF measurement aid module via the coupled handle or via the coupled mobile platform and thus via the object interface.

13. The six DOF measurement aid module according to claim 11, wherein the feed is configured to supply electrical power to:
a. the visual markings, and
b. sensor attachments coupled via the sensor attachment coupling device, and thus via the sensor interface.

14. The six DOF measurement aid module according to claim 11, further comprising a consumer power regulating functionality with power supply display, wherein the consumer power regulating functionality
a. identifies a power source connected for the feed and displays the power source by means of the power supply display, and,
b. in the case of a connected battery power source, furthermore ascertains a charge level of the battery power source and displays the charge level by means of the power supply display and regulates the power consumption of the six DOF measurement aid module on the basis of the charge level.

15. A six degree-of-freedom (DOF) measuring system comprising:
a. a six DOF measurement aid module according to claim 1;
b. a laser tracker having a position and orientation determining functionality for determining a position and orientation of the measurement aid module,
wherein the laser tracker is configured to determine 3D coordinates of points to be measured of an object surface on the basis of:
c. coupling information relating to
a coupled and decoupled state of a sensor attachment, of a handle or of a mobile platform, and
the identification of a coupled sensor attachment of a coupled handle or of a coupled mobile platform,
d. measurement information, and
e. the pattern formed by the visual markings.

16. A computer program product comprising non-transitory program code fixed in a tangible medium which, when the latter is executed, instructs a computer or a plurality of computing units connected to form a computer to determine 3D coordinates of points to be measured of an object surface, on the basis of:
- a. coupling information relating to
  - a coupled and decoupled state of a sensor attachment, of a handle or of a mobile platform, and
  - the identification of a coupled sensor attachment, of a coupled handle or of a coupled mobile platform,
- b. measurement information, and
- c. a pattern formed by visual markings, of a six DOF measurement aid module according to claim 1.

* * * * *